United States Patent
Atsumi et al.

(10) Patent No.: US 9,493,188 B2
(45) Date of Patent: Nov. 15, 2016

(54) VEHICLE LOWER PORTION STRUCTURE

(71) Applicant: Toyota Jidosha Kabushiki Kaisha, Toyota-shi (JP)

(72) Inventors: Hyuga Atsumi, Toyota (JP); Susumu Takenaka, Toyota (JP); Kunihiko Yoshioka, Toyota (JP); Tetsuo Nuruki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/858,009

(22) Filed: Sep. 18, 2015

(65) Prior Publication Data

US 2016/0137228 A1    May 19, 2016

(30) Foreign Application Priority Data

Nov. 13, 2014 (JP) ................. 2014-230811

(51) Int. Cl.
*B62D 25/20* (2006.01)
*B62D 21/15* (2006.01)
*B62D 21/06* (2006.01)

(52) U.S. Cl.
CPC ............... *B62D 21/06* (2013.01); *B62D 21/15* (2013.01); *B62D 25/20* (2013.01)

(58) Field of Classification Search
CPC .. B62D 21/15; B62D 21/152; B62D 21/155; B62D 21/157; B62D 25/20

USPC ................ 296/204, 203.01, 203.02
See application file for complete search history.

(56) References Cited

U.S. PATENT DOCUMENTS

2005/0082877 A1*  4/2005  Gotou .................. B62D 21/157
                                                                         296/204

FOREIGN PATENT DOCUMENTS

| JP | 6-144300 | 5/1994 |
| JP | 8-119151 | 5/1996 |
| JP | 2005-206108 | 8/2005 |
| JP | 2013-103650 | 5/2013 |

* cited by examiner

*Primary Examiner* — Dennis H Pedder
(74) *Attorney, Agent, or Firm* — Oblon, McClelland, Maier & Neustadt, L.L.P.

(57) ABSTRACT

A vehicle lower portion structure has: a tunnel portion disposed at a vehicle transverse direction central portion of a floor portion; a front side member whose rear portion is disposed at a vehicle lower side of the floor portion and a vehicle transverse direction outer side of the tunnel portion; a first member including a first horizontal wall that extends from the rear portion toward a vehicle transverse direction inner side, and a first vertical wall bent toward a vehicle upper side from the first horizontal wall; and a second member spanning an opening portion of the tunnel portion. The second member includes a second horizontal wall joined to the first horizontal wall, and a second vertical wall that is bent toward the vehicle upper side from the second horizontal wall, is disposed parallel to the first vertical wall, and is joined to the first vertical wall.

5 Claims, 9 Drawing Sheets

VEHICLE LOWER PORTION STRUCTURE

CROSS-REFERENCE TO RELATED APPLICATION

This application claims priority under 35 USC 119 from Japanese Patent Application No. 2014-230811 filed Nov. 13, 2014, the disclosure of which is incorporated by reference herein.

BACKGROUND

1. Technical Field

The present invention relates to a vehicle lower portion structure.

2. Related Art

In the vehicle lower portion structure disclosed in Japanese Patent Application Laid-Open (JP-A) No. 2005-206108, rear end portions of bent portions at a pair of left and right front side members are connected by an engine rear support member that forms a substantial X-shape as seen in plan view. Further, the bent portions are formed in substantial U-shapes in cross-section that open toward the vehicle upper side, and the side walls of the front side members are joined to the side walls of a floor tunnel (a tunnel portion). Due thereto, the load that is inputted to one of the front side members can be transmitted to the other front side member via the engine rear support member, and can be transmitted to the tunnel portion.

However, the vehicle lower portion structure disclosed in JP-A No. 2005-206108 has the following problematic point. Namely, for example, in a so-called oblique collision in which there is a collision with the vehicle front portion from an obliquely front side, a large collision load is inputted from the front side member along a direction oblique to the vehicle. On the other hand, in the above-described structure, the engine rear support member is fastened and fixed to the bottom walls (horizontal walls) of the front side members. Thus, when collision load is inputted to a front side member, shearing load is applied to the portions where the front side members and the engine rear support member are fastened together, and there is the possibility that these fastened portions will shear. Due thereto, there is the possibility that the load transmitting efficiency of the engine rear support member with respect to collision load will deteriorate.

SUMMARY

In view of the above-described circumstances, the present invention provides a vehicle lower portion structure that can efficiently transmit collision load to a tunnel portion at the time of an oblique collision.

A vehicle lower portion structure of a first aspect of the present invention has: a tunnel portion that extends in a vehicle longitudinal direction at a vehicle transverse direction central portion of a floor portion of a vehicle cabin, and opens toward a vehicle lower side as seen from the vehicle longitudinal direction; a front side member that is disposed such that a length direction thereof extends in the vehicle longitudinal direction, and whose rear portion is disposed at a vehicle lower side of the floor portion and a vehicle transverse direction outer side of the tunnel portion; a first member that is structured to include a first horizontal wall that extends from the rear portion of the front side member toward a vehicle transverse direction inner side and whose plate thickness direction is a vehicle vertical direction, and a first vertical wall that is bent toward a vehicle upper side from the first horizontal wall and that, as seen in a bottom view, is inclined toward a vehicle rear side while heading toward the vehicle transverse direction inner side; and a second member that is disposed so as to span an opening portion of the tunnel portion, and extends along a direction of inclination of the first vertical wall, and connects both vehicle transverse direction side portions of the tunnel portion. The second member is structured to include a second horizontal wall that is disposed such that a plate thickness direction thereof extends in the vehicle vertical direction, and that is joined to the first horizontal wall, and a second vertical wall that is bent toward the vehicle upper side from the second horizontal wall, is disposed parallel to the first vertical wall, and is joined to the first vertical wall.

In the first aspect, the tunnel portion extends in the vehicle longitudinal direction at the vehicle transverse direction central portion of the floor portion of the vehicle cabin. As seen from the vehicle longitudinal direction, the tunnel portion opens toward the vehicle lower side. Further, the rear portion of a front side member, whose length direction extends in the vehicle longitudinal direction, is provided at the lower side of the floor portion of the vehicle cabin, and this rear portion is disposed at the vehicle transverse direction outer side of the tunnel portion.

Here, the first member extends toward the vehicle transverse direction inner side from the rear portion of the front side member. Further, the first member is structured to include the first horizontal wall whose plate thickness direction is the vehicle vertical direction, and the first vertical wall that is bent toward the vehicle upper side from the first horizontal wall. As seen in a bottom view, the first vertical wall is inclined toward the vehicle rear side while heading toward the vehicle transverse direction inner side. Therefore, when, at the time of an oblique collision, collision load that is directed obliquely toward the rear side and the vehicle transverse direction inner side is inputted to the front side member, that collision load is transmitted from the front side member to the first member. The collision load, that has been transmitted to the first member, is transmitted efficiently toward the vehicle rear side along the bending ridgeline between the first horizontal wall and the first vertical wall.

Further, here, the second member, that is joined to the first member, is disposed so as to span the opening portion of the tunnel portion. Further, the second member extends along the direction of inclination of the first vertical wall, and connects the both vehicle transverse direction side portions of the tunnel portion. Therefore, the collision load, that has been transmitted to the first member, is transmitted to the second member, and, by the second member, is dispersed to the both vehicle transverse direction side portions of the tunnel portion.

Moreover, the second member has the second horizontal wall that is disposed such that the plate thickness direction thereof extends in the vehicle vertical direction. The second horizontal wall is joined to the first horizontal wall of the first member. Further, the second member has the second vertical wall that is bent toward the vehicle upper side from the second horizontal wall. The second vertical wall is disposed parallel to the first vertical wall, and is joined to the first vertical wall. Therefore, the collision load, that is transmitted to the second member along the bending ridgeline between the first horizontal wall and the first vertical wall at the first member, can, while being received by the second vertical wall, be effectively transmitted to the bending ridgeline between the second horizontal wall and the second vertical wall at the second member. Due thereto, this collision load is efficiently transmitted along the bending ridgeline of the second member toward the vehicle rear side. Accordingly, at the time of an oblique collision, the collision load can be transmitted efficiently to the tunnel portion.

In a vehicle lower portion structure of a second aspect of the present invention, in the first aspect, a pair of first members are provided at vehicle transverse direction outer sides of the tunnel portion, and a pair of second members are provided at the opening portion of the tunnel portion, and the pair of second members intersect each other in an X-shape as seen in a bottom view, and one of the second members is joined to a length direction central portion of the other of the second members.

In the second aspect, the pair of second members intersect each other in an X-shape as seen in a bottom view. The both vehicle transverse direction side portions of the tunnel portion are connected by the pair of second members. Therefore, collision load can be efficiently transmitted to the tunnel portion while the rigidity of the floor portion (the floor) is increased by the second members.

In a vehicle lower portion structure of a third aspect of the present invention, in the second aspect, a pair of tunnel reinforcements, that extend in the vehicle longitudinal direction, are joined to portions of the floor portion which portions are adjacent to the tunnel portion, and vehicle transverse direction inner side end portions of the first members and front end portions of the second members are joined to the tunnel reinforcements.

In the third aspect, the collision load that is inputted to the first member can be dispersed to the second member and one of the tunnel reinforcements. Further, the collision load, that has been inputted to the one tunnel reinforcement, can be effectively transmitted along that tunnel reinforcement toward the vehicle rear side. Further, the collision load, that was inputted to the first member, is transmitted to the other tunnel reinforcement, and can be effectively transmitted along that tunnel reinforcement toward the vehicle rear side.

In a vehicle lower portion structure of a fourth aspect of the present invention, in the third aspect, rockers that extend in the vehicle longitudinal direction are provided at vehicle transverse direction both sides of the floor portion, and the rockers are connected to the tunnel reinforcements by cross members that extend in a vehicle transverse direction, and, as seen in a bottom view, rear end portions of the second members are joined to joined portions, that are joined to the cross members, at the tunnel reinforcements.

In the fourth aspect, the collision load, that was transmitted from the second member to the tunnel reinforcement, can be dispersed to the cross member and the rocker. Due thereto, the effect of dispersing the collision load at the time of an oblique collision can be improved.

In a vehicle lower portion structure of a fifth aspect of the present invention, in the third aspect, each of the tunnel reinforcements is structured to include, as seen in a cross-sectional view seen from the vehicle longitudinal direction, a bottom wall that is disposed such that a plate thickness direction thereof extends in the vehicle vertical direction, an inner side wall that extends toward the vehicle upper side from a vehicle transverse direction inner side end of the bottom wall, and an outer side wall that extends toward the vehicle upper side from a vehicle transverse direction outer side end of the bottom wall, and the front end portions of the second members are joined to the inner side walls.

In the fifth aspect, the front end portions of the second members are joined to the inner side walls of the tunnel reinforcements. Namely, there is a structure in which the tunnel reinforcements are supported from the vehicle transverse direction inner sides by the second members. Therefore, when collision load, that is directed obliquely toward the rear side and the vehicle transverse direction inner side, is transmitted from the first member to the tunnel reinforcement at the time of an oblique collision, that collision load can be transmitted to the second member while being received by the front end portion and the second vertical wall of the second member. Due thereto, collision load can be transmitted more efficiently to the second member, while breakage at the joined region of the second member and the tunnel reinforcement is suppressed more.

BRIEF DESCRIPTION OF THE DRAWINGS

Exemplary embodiments of the present invention will be described in detail based on the following figures, wherein.

DETAILED DESCRIPTION

Figure 1:
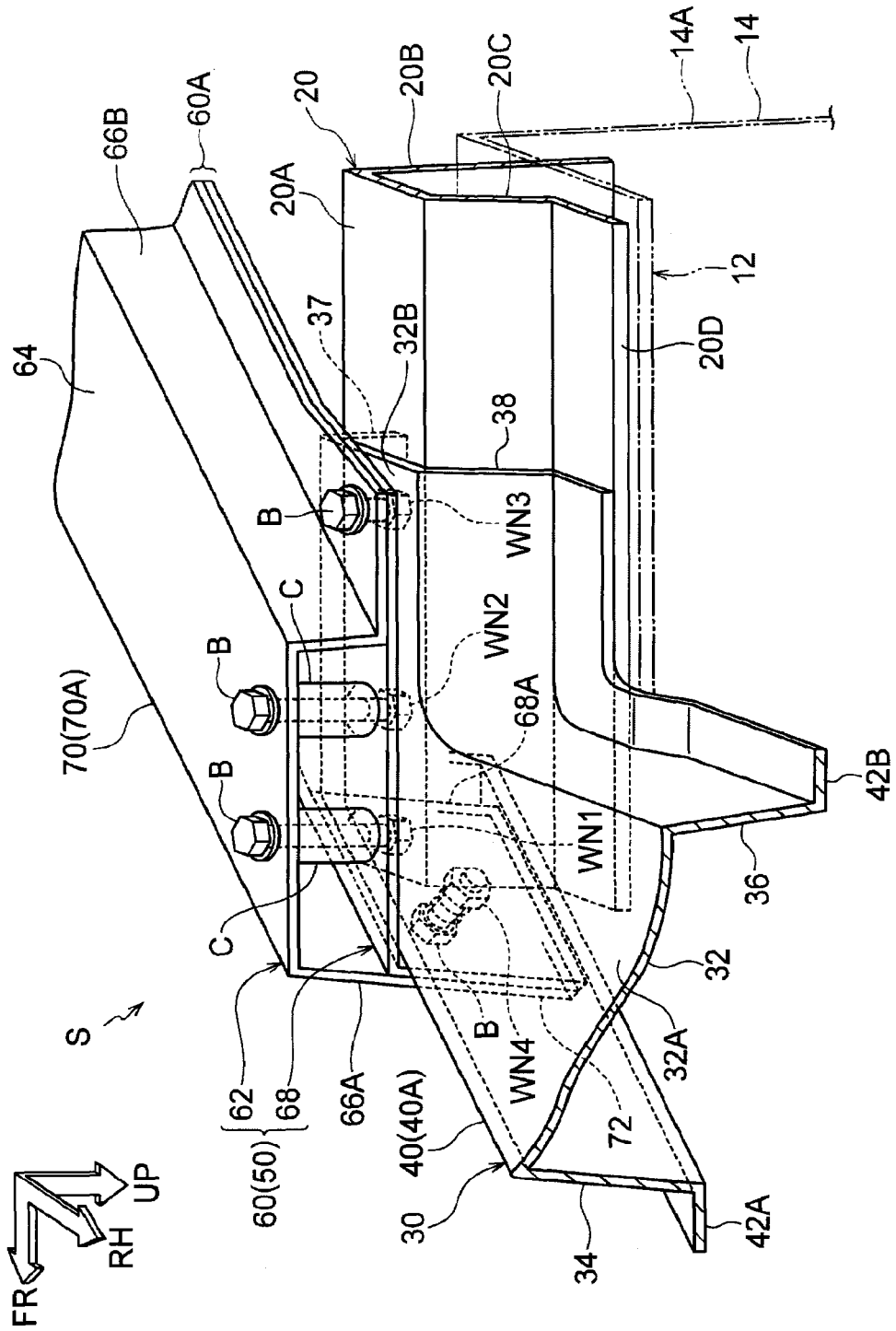
FIG. 1 is a perspective view that is seen from a vehicle obliquely lower right side and shows a joined state of an inner torque box and a first brace that are used in a vehicle lower portion structure relating to a present embodiment.

A vehicle lower portion structure S relating to a present embodiment is described hereinafter by using the drawings. Note that arrow FR, arrow UP and arrow RH that are shown appropriately in the drawings indicate the vehicle front side, the vehicle upper side and the vehicle right side (a vehicle transverse direction one side) of a vehicle V to which the vehicle lower portion structure S is applied. Hereinafter, when explanation is given by using merely longitudinal, vertical and left-right directions, they mean the longitudinal of the vehicle longitudinal direction, the vertical of the vehicle vertical direction, and the left and right when facing forward, unless otherwise indicated.

Figure 2:
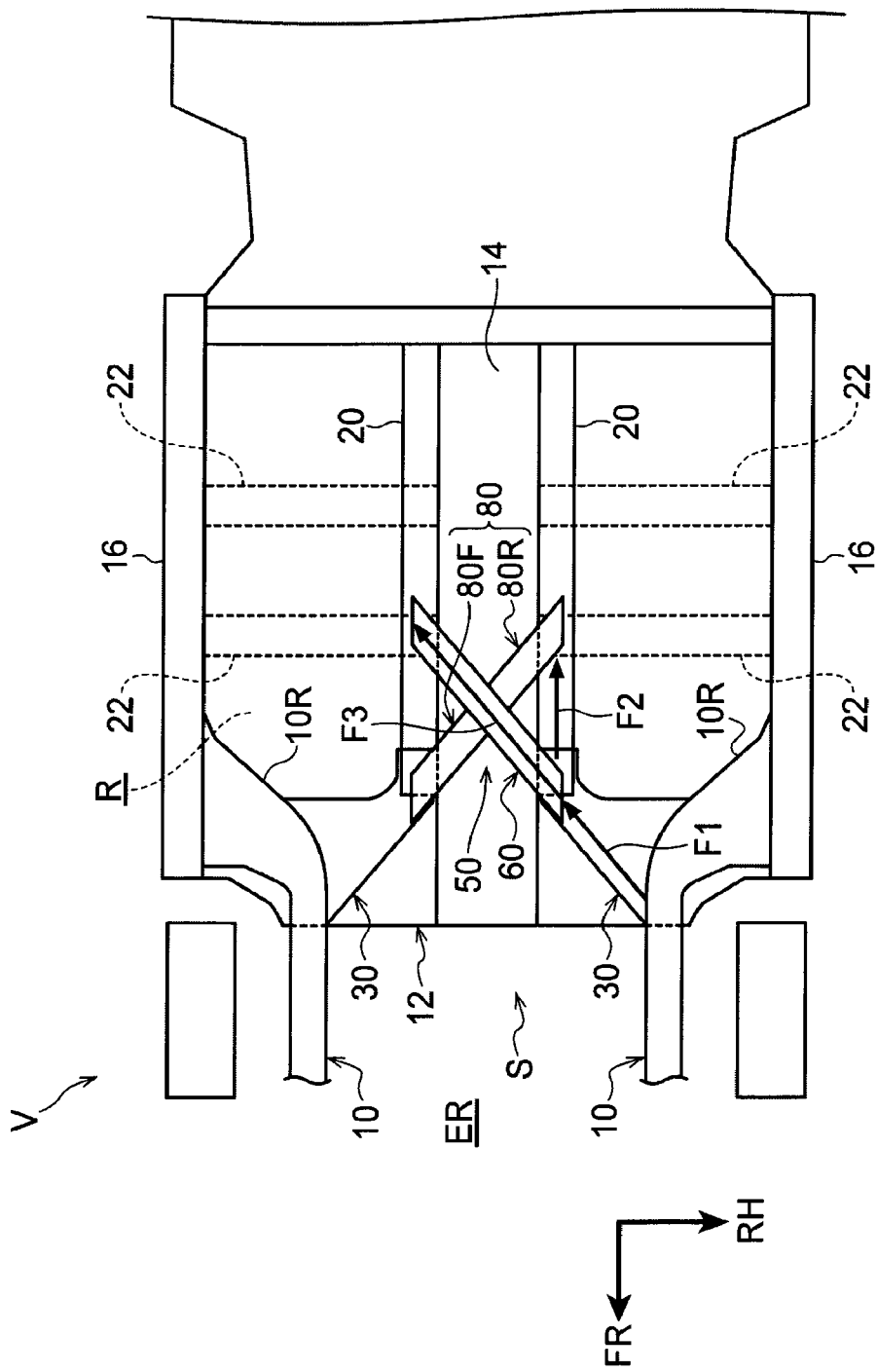
FIG. 2 is a bottom view for explaining a transmission path of collision load at the time of an oblique collision of a vehicle to which the vehicle lower portion structure relating to the present embodiment is applied.

As shown in FIG. 2, the vehicle lower portion structure S is structured to include a pair of left and right front side members 10 (hereinafter called FS members 10) that are disposed at the front portion of the vehicle V, a floor panel 12 that structures the floor portion of a vehicle cabin R of the vehicle V, a pair of left and right rockers 16 that are provided at the vehicle transverse direction both sides of the floor panel 12, a pair of left and right tunnel reinforcements 20 (hereinafter called tunnel RFs 20) that are provided at the floor panel 12, and floor cross members 22 that serve as "cross members". Further, the vehicle lower portion structure S has inner torque boxes 30 (hereinafter simply called torque boxes 30) that serve as a pair of left and right "first members", and a brace unit 50 that connects the pair of tunnel RFs 20. The respective structures thereof are described hereinafter.

(FS Members 10)

As shown in FIG. 2, the FS members 10 are provided at an engine room ER that is disposed at the front portion of the vehicle V, and are formed in substantially rectangular pillar shapes that are hollow and whose length directions extend in the longitudinal direction. Note that the engine room ER is sectioned-off from the vehicle cabin R by a well-known dash panel (not illustrated). Further, the dash panel is disposed such that the plate thickness direction thereof extends in the longitudinal direction, and the lower end portion of the dash panel is tilted rearward while heading toward the lower side.

Figure 3:
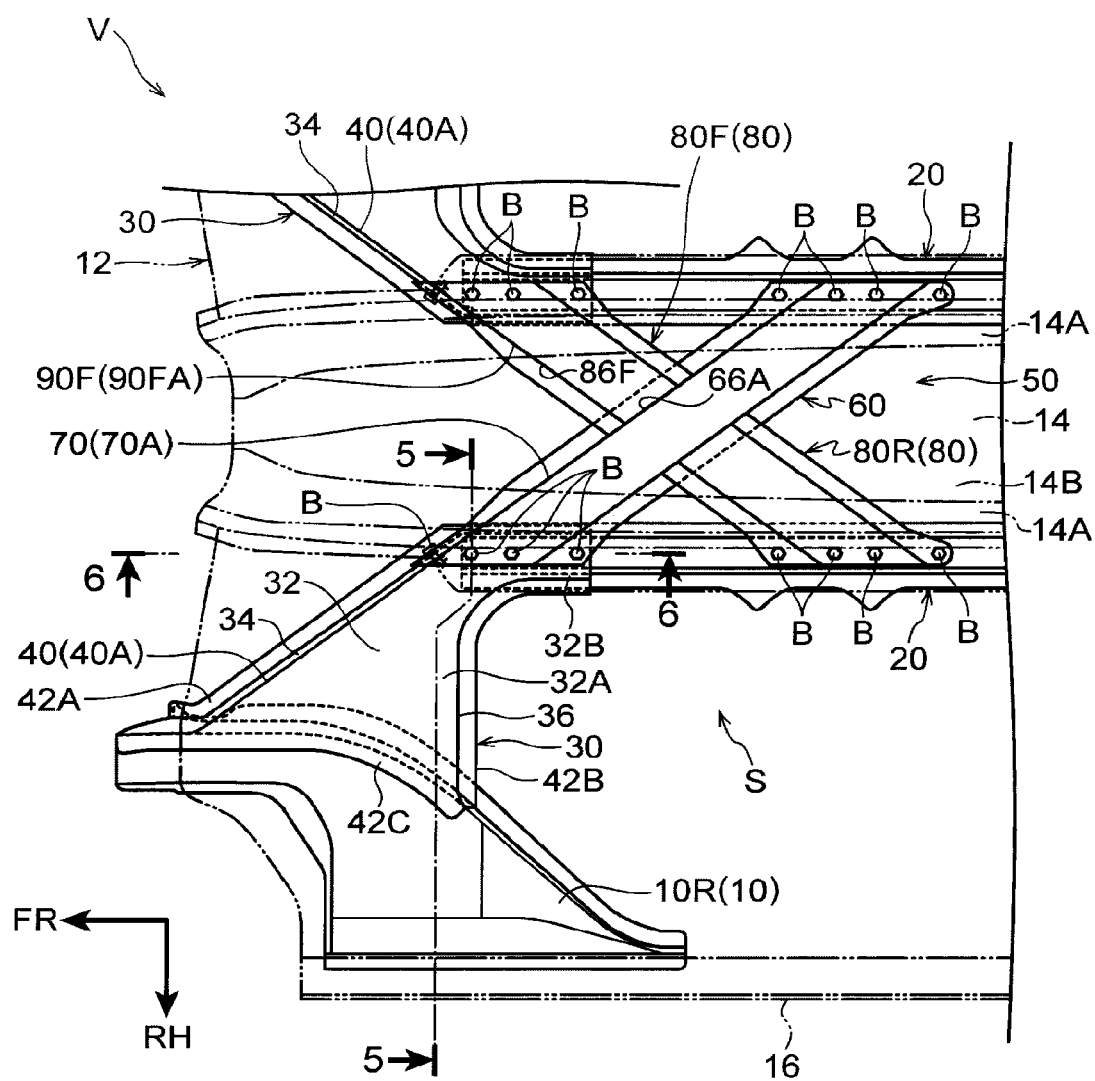
FIG. 3 is a bottom view that is seen from the vehicle lower side and shows main portions of the vehicle lower portion structure relating to the present embodiment.

As shown in FIG. 3, the rear portion of the FS member 10 is made to be a front side member rear portion 10R (hereinafter called FS member rear portion 10R). The FS member rear portion 10R is disposed along the front surface of the lower end portion of the dash panel and the lower surface of the front portion of the floor panel 12 that is described later. Further, in a cross-section seen from the length direction of the FS member rear portion 10R, the FS member rear portion 10R is formed substantially in the shape of a hat, in cross-section, that opens toward the upper side, and the open end portion of the FS member rear portion 10R is joined to the dash panel and the floor panel 12. Moreover, as seen in a bottom view, the FS member rear portion 10R is bent toward the vehicle transverse direction outer side, and the width of the FS member rear portion 10R is set to become greater toward the rear end of the FS member rear portion 10R. Further, the rear end of the FS member rear portion 10R is joined to the front end portion of the rocker 16 that is described later.

(Floor Panel 12)

Figure 5:
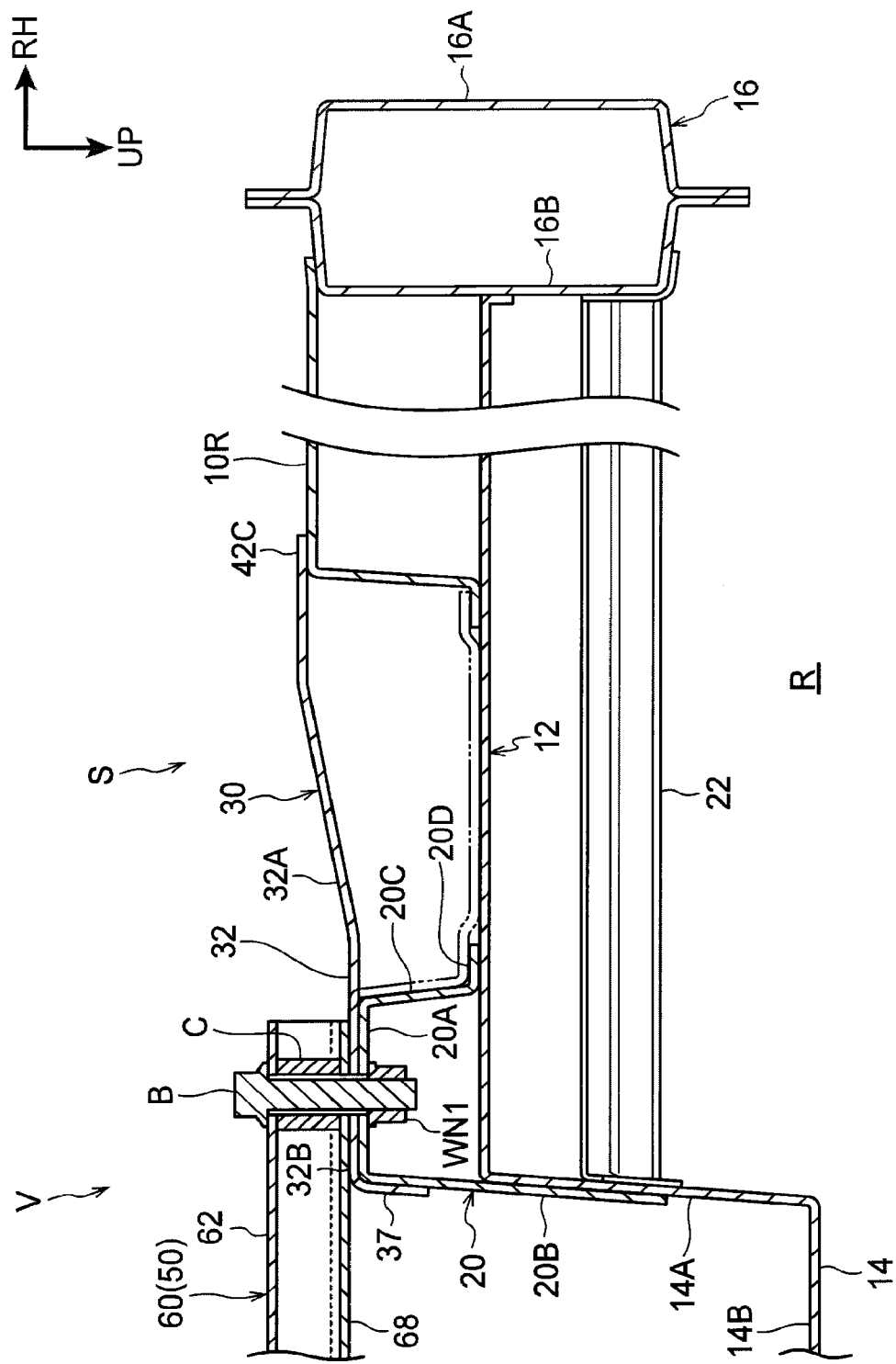
FIG. 5 is an enlarged cross-sectional view in which a region of a torque box of the vehicle lower portion structure shown in FIG. 3 is seen from the vehicle front side (a cross-sectional view along line 5-5 of FIG. 3)

The floor panel 12 is structured by a thin plate part such as a steel plate or the like. Further, the floor panel 12 is disposed such that the vertical direction is the plate thickness direction thereof, and the front end portion of the floor panel 12 is joined to the lower end portion of the dash panel. As shown in FIG. 5 as well, a tunnel portion 14 that extends in the longitudinal direction is formed at the vehicle transverse direction central portion of the floor panel 12. This tunnel portion 14 projects-out toward the upper side, and, in a cross-section seen from the longitudinal direction, is formed substantially in the shape of an upside-down U that opens downward. Concretely, the tunnel portion 14 is structured to include a pair of left and right side walls 14A that structure the both vehicle transverse direction side portions of the tunnel portion 14, and an upper wall 14B that connects the upper ends of the side walls 14A together. Note that, in the present embodiment, the tunnel portion 14 is formed integrally with the floor panel 12, but, for example, the floor panel 12 and the tunnel portion 14 may be formed by separate members, and the both may be joined together and made integral by welding or the like.

(Rockers 16)

The rockers 16 are provided at the vehicle transverse direction both sides of the floor panel 12, and extend in the longitudinal direction. Further, as shown in FIG. 5, the rocker 16 is structured to include a rocker outer panel 16A that structures the vehicle transverse direction outer side portion of the rocker 16, and a rocker inner panel 16B that structures the vehicle transverse direction inner side portion of the rocker 16. The rocker outer panel 16A and the rocker inner panel 16B are formed substantially in the shapes of hats, in cross-section, that open in directions of facing one another, and the respective open end portions thereof are joined together by welding or the like. Due thereto, the rocker 16 forms a closed cross-sectional structure.

(Tunnel RFs 20)

The tunnel RFs 20 are provided at the lower side of the floor panel 12, and, as seen in a bottom view, are disposed so as to be adjacent to the tunnel portion 14 at the vehicle transverse direction outer sides thereof. Further, the tunnel RF 20 is formed in an elongated shape whose length direction extends in the longitudinal direction, and, as seen from the length direction thereof, is formed in a substantial U-shape that opens toward the upper side. Concretely, the tunnel RF 20 is structured to include a bottom wall 20A that is disposed such that the plate thickness direction thereof extends in the vertical direction, an inner side wall 20B that extends toward the upper side from the vehicle transverse direction inner side end of the bottom wall 20A, and an outer side wall 20C that extends toward the upper side from the vehicle transverse direction outer side end of the bottom wall 20A. Further, the upper portion of the inner side wall 20B is disposed adjacent to the side wall 14A of the tunnel portion 14 at the vehicle transverse direction inner side thereof, and is joined to the side wall 14A by welding or the like. Further, a flange 20D, that juts-out toward the vehicle transverse direction outer side, is formed at the upper end portion of the outer side wall 20C of the tunnel RF 20. The flange 20D is joined by welding or the like to the bottom surface of the floor panel 12. Due thereto, a closed cross-section is formed between the tunnel RF 20 and the floor panel 12.

(Floor Cross Members 22)

As shown in FIG. 2, the floor cross members 22 are provided at the rear sides of the FS member rear portions 10R, and are disposed between the tunnel portion 14 and the rockers 16 at the upper side of the floor panel 12. Plural (here, two) of the floor cross members 22 are disposed so as to be lined-up in the longitudinal direction at each of the vehicle transverse direction outer side of the tunnel portion 14. Namely, in the present embodiment, four of the floor cross members 22 are provided. Further, as shown in FIG. 5, the floor cross member 22 is formed in a substantially elongated shape whose length direction extends in the vehicle transverse direction, and, as seen from the length direction thereof, is formed in a substantial hat shape, in cross-section, that opens toward the lower side. Further, the open end portion of the floor cross member 22 is joined by welding or the like to the top surface of the floor panel 12. Due thereto, a closed cross-section (not illustrated) is formed between the floor cross member 22 and the floor panel 12.

Further, the vehicle transverse direction outer side end portion of the floor cross member 22 is joined to the rocker inner panel 16B by welding or the like. On the other hand, the vehicle transverse direction inner side end portion of the floor cross member 22 is joined to the side wall 14A of the tunnel portion 14 by welding or the like. Due thereto, the rockers 16 and the tunnel portion 14 are connected in the vehicle transverse direction by the floor cross members 22, and the floor cross members 22 are joined to the tunnel RFs 20 via the floor panel 12.

(Torque Boxes 30)

As shown in FIG. 3, the torque boxes 30 are disposed at the lower side of the floor panel 12, and extend in the vehicle transverse direction at the vehicle transverse direction inner sides of the FS member rear portions 10R. Further, as seen from the direction in which the torque box 30 extends, the torque box 30 is formed (bent) substantially in the shape of a hat, in cross-section, that opens toward the upper side (see FIG. 1). Concretely, the torque box 30 has a horizontal bottom wall portion 32 that serves as a "first horizontal wall" and whose plate thickness direction is the vertical direction. This horizontal bottom wall portion 32 is structured to include a main body portion 32A that is formed in a substantially triangular shape as seen in a bottom view, and a projecting portion 32B that is substantially rectangular and projects-out toward the rear side from the vehicle transverse direction inner side end portion of the main body portion 32A. Further, as seen in a bottom view, the front end of the main body portion 32A is inclined toward the rear side while heading toward the vehicle transverse direction inner side, and the rear end of the main body portion 32A extends along the vehicle transverse direction. Namely, the width of the torque box 30 is set so as to become larger toward the vehicle transverse direction outer side.

As shown in FIG. 1, the torque box 30 has a torque box vertical wall 34 that serves as a "first vertical wall" that extends toward the upper side from the front end of the horizontal bottom wall portion 32. Further, the boundary portion between the torque box vertical wall 34 and the horizontal bottom wall portion 32 is made to be a bent portion 40, and a bending ridgeline 40A is formed at the bent portion 40. Due thereto, the torque box vertical wall 34 and the bent portion 40 (the bending ridgeline 40A) are, as seen in a bottom view, inclined toward the rear side while heading toward the vehicle transverse direction inner side (see FIG. 3). Further, when load that is directed obliquely toward the rear side and the vehicle transverse direction inner side is inputted to the torque box 30, this load is mainly transmitted toward the rear side and the vehicle transverse direction inner side along the bent portion 40 (the bending ridgeline 40A) of the torque box 30.

Further, the torque box 30 has a rear wall 36 that extends toward the upper side from the rear end of the main body portion 32A at the horizontal bottom wall portion 32, an inner side wall 37 that extends toward the upper side from the vehicle transverse direction inner side end of the projecting portion 32B at the horizontal bottom wall portion 32, and an outer side wall 38 that extends toward the upper side from the vehicle transverse direction outer side end of the projecting portion 32B. Further, the front end of the inner side wall 37 and the vehicle transverse direction inner side end of the torque box vertical wall 34 are connected, and the front end of the outer side wall 38 and the vehicle transverse direction inner side end of the rear wall 36 are gently connected. Further, the front end portion of the tunnel RF 20 is disposed between the inner side wall 37 and the outer side wall 38, and the horizontal bottom wall portion 32 covers the front end portion of the tunnel RF 20 from the lower side. Namely, the front end portion of the tunnel RF 20 is disposed at the interior of the vehicle transverse direction inner side end portion of the torque box 30.

Moreover, a front side flange 42A that juts-out toward the front side is formed at the upper end of the torque box vertical wall 34. The front side flange 42A is joined by welding or the like to the bottom surface of the floor panel 12 (not shown in FIG. 1). On the other hand, a rear side flange 42B that juts-out toward the rear side is formed at the upper end of the rear wall 36. The rear side flange 42B is joined by welding or the like to the bottom surface of the floor panel 12. The vehicle transverse direction inner side end portion of the rear side flange portion 42B is connected to the upper end of the outer side wall 38, and is bent toward the rear side along the outer side wall 38. Moreover, the vehicle transverse direction inner side end portion of the rear side flange 42B is disposed one step lower so as to be adjacent to the lower side of the flange 20D of the tunnel RF 20, and, together with the flange 20D of the tunnel RF 20, is joined to the floor panel 12 by welding or the like.

Further, as shown in FIG. 3, an outer side flange 42C, that juts-out toward the lower side of the FS member rear portion 10R, is formed at the vehicle transverse direction outer side end portion of the horizontal bottom wall portion 32. Moreover, the front end portion and the rear end portion of the outer side flange 42C extend toward the upper side along the vehicle transverse direction outer side ends of the torque box vertical wall 34 and the rear wall 36, and are connected to the vehicle transverse direction outer side ends of the front side flange 42A and the rear side flange 42B. Further, the outer side flange 42C is joined by welding or the like to the FS member rear portion 10R. Due thereto, the torque box 30 is joined to the FS member rear portion 10R.

(Brace Unit 50)

As shown in FIG. 3, the brace unit 50 is formed in a substantial X-shape as seen in a bottom view, and is disposed at the lower side of the pair of tunnel RFs 20 (the tunnel portion 14 of the floor panel 12). Further, the brace unit 50 is structured to include a first brace 60 and a second brace 80 that serve as "second members". The first brace 60 and the second brace 80 are disposed so as to span the opening portion of the tunnel portion 14, and connect the pair of tunnel RFs 20. Concrete description is given hereinafter.

(First Brace 60)

Figure 4:
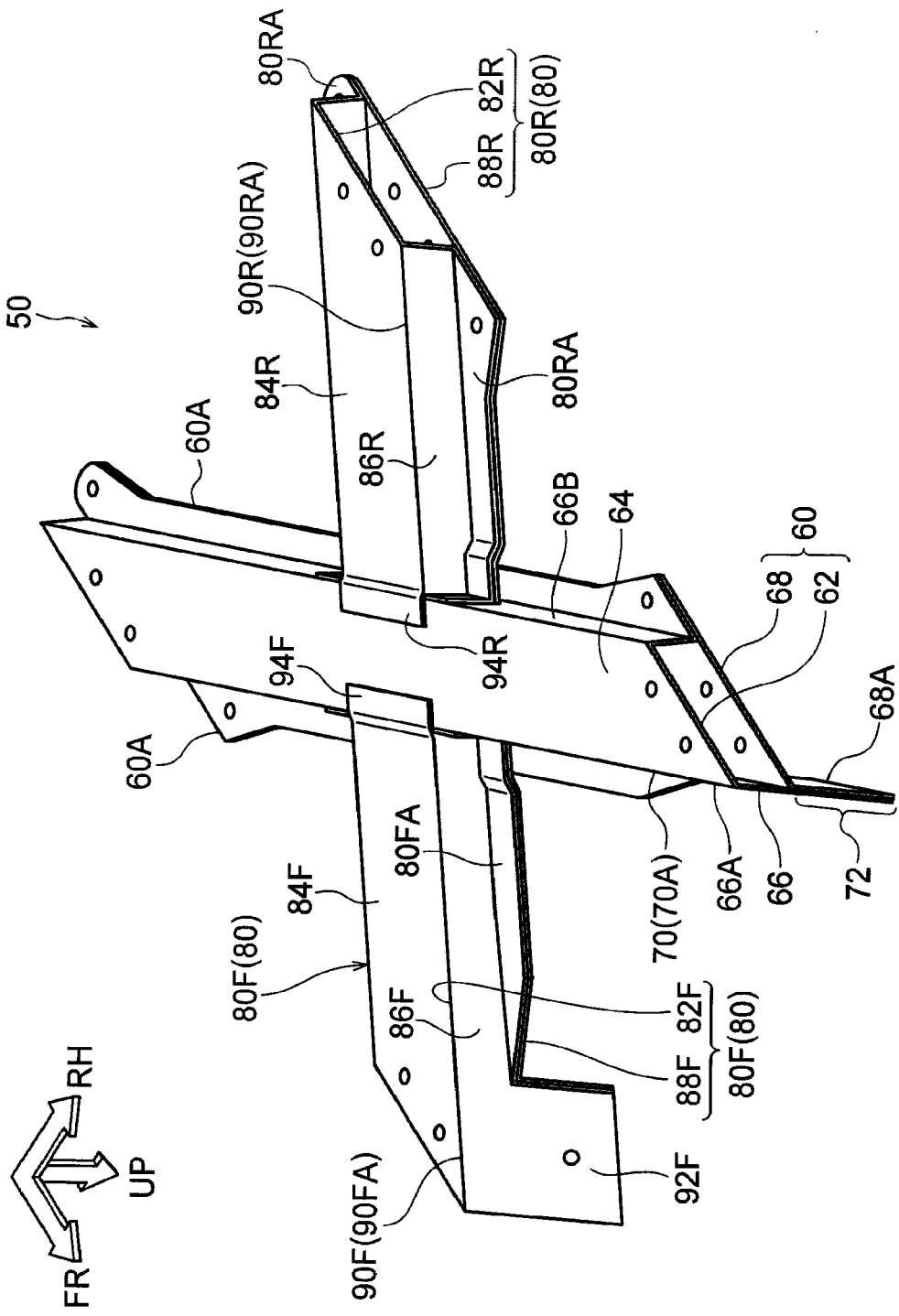
FIG. 4 is a perspective view that is seen from the vehicle lower side and shows a brace unit shown in FIG. 3.

The first brace 60 is formed substantially in the shape of a rectangular pillar that is hollow, and, as seen in a bottom view, extends along the direction of inclination of the torque box vertical wall 34 of the one (the right side) torque box 30. Further, as shown in FIG. 4 and FIG. 6, the first brace 60 is structured to include a brace lower panel 62 that structures the lower side portion of the first brace 60, and a brace upper panel 68 that structures the upper side portion of the first brace 60.

As seen from the length direction of the brace lower panel 62, the brace lower panel 62 is (bendingly) formed in a substantial hat shape, as seen in cross-section, that opens toward the upper side. Concretely, the brace lower panel 62 is structured to include a horizontal bottom wall portion 64 that serves as a "second horizontal wall" and whose plate thickness direction is the vertical direction, and brace vertical walls 66A, 66B that extend toward the upper side from the transverse direction both ends of the horizontal bottom wall portion 64. On the other hand, the brace upper panel 68 is formed substantially in the shape of an elongated plate whose plate thickness direction is the vertical direction. Further, the open end portion of the brace lower panel 62 is joined by welding or the like to the brace upper panel 68. Due thereto, a pair of flange portions 60A (see FIG. 4), whose plate thickness direction is the vertical direction, are formed at the transverse direction both end portions of the first brace 60.

Figure 6:
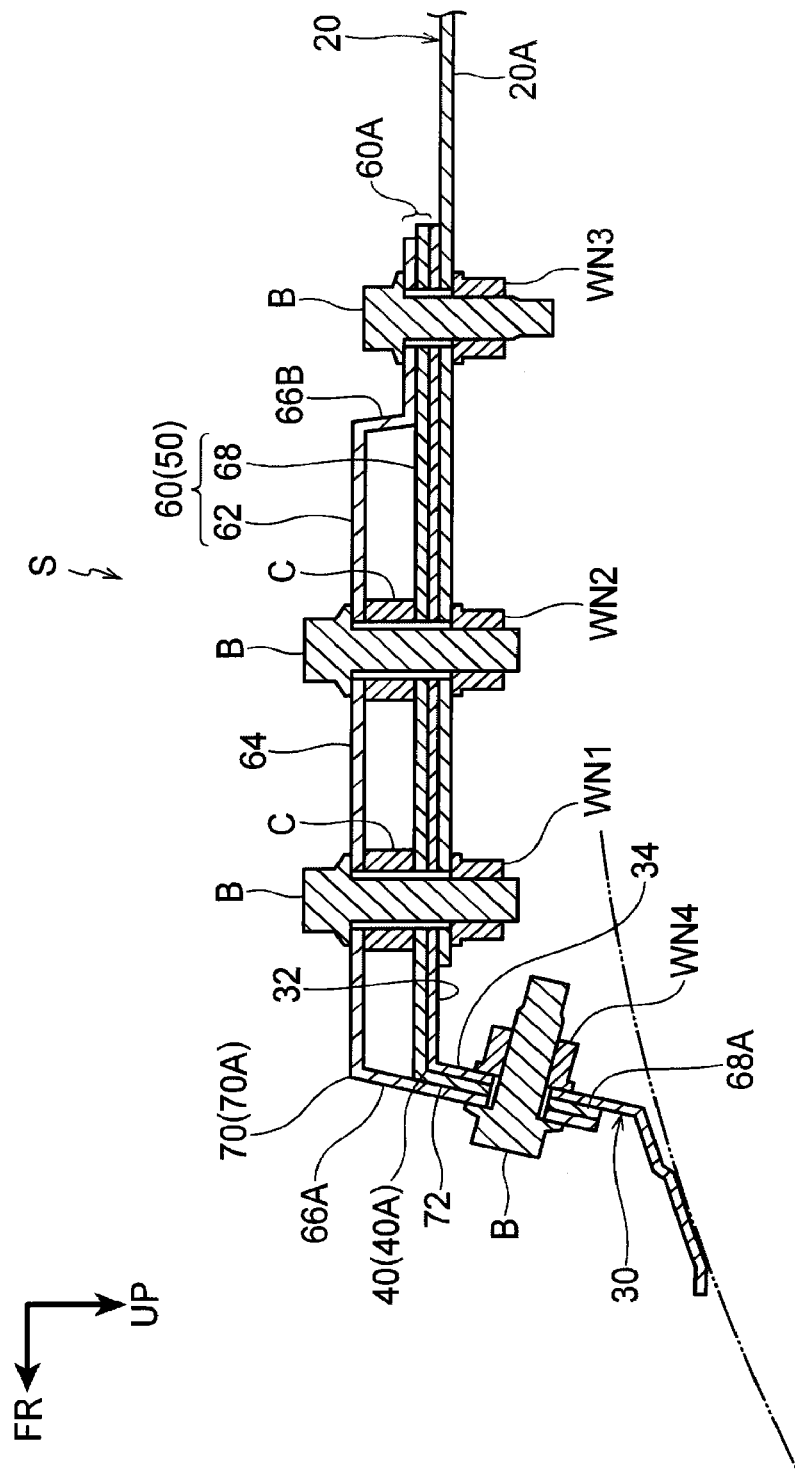
FIG. 6 is an enlarged cross-sectional view in which a region of the vehicle transverse direction inner side end portion of the torque box of the vehicle lower portion structure shown in FIG. 3 is seen from the vehicle right side (a cross-sectional view along line 6-6 of FIG. 3)

Further, the brace vertical wall 66A that is at a transverse direction one side of the brace lower panel 62 corresponds to the "second vertical wall" of the present invention, and the brace vertical wall 66A is disposed parallel to the torque box vertical wall 34 (see FIG. 1 and FIG. 6). Further, the boundary portion between the brace vertical wall 66A and the horizontal bottom wall portion 64 is made to be a bent portion 70, and a bending ridgeline 70A is formed by the bent portion 70. Due thereto, as seen in a bottom view, the brace vertical wall 66A and the bent portion 70 (the bending ridgeline 70A) extend along the direction of inclination of the torque box vertical wall 34 (see FIG. 3). Further, as shown in FIG. 4, the flange 60A is omitted at the front end portion of the brace vertical wall 66A, and the front end portion of the brace vertical wall 66A extends-out toward the upper side with respect to the brace upper panel 68. Moreover, a folded portion 68A is formed at the front end portion of the brace upper panel 68 so as to correspond to this extended portion of the brace vertical wall 66A. The folded portion 68A is folded parallel to the brace vertical wall 66A, and overlaps the brace vertical wall 66A in the plate thickness direction. This overlapping portion is made to be a joined portion 72.

Moreover, as shown in FIG. 1 and FIG. 6, the front end portion of the first brace 60 is disposed adjacent to the lower side of the vehicle transverse direction inner side end portion of the one (the right side) torque box 30. The joined portion 72 of the first brace 60 is disposed adjacent to the front side of the torque box vertical wall 34. Further, the first brace 60 is joined (fastened and fixed) to the front end portion of the one (the right side) tunnel RF 20 and to the vehicle transverse direction inner side end portion of the torque box 30. Concretely, three weld nuts WN1 through WN3 are fixed to the top surface of the bottom wall 20A of the tunnel RF 20, and these weld nuts WN1 through WN3 are disposed so as to be lined-up in the longitudinal direction. Further, a weld nut W4 is fixed to the rear surface of the torque box vertical wall 34 at a position facing the joined portion 72 of the first brace 60.

Further, the horizontal bottom wall portion 64 of the brace lower panel 62 and the brace upper panel 68 are joined (fastened and fixed), together with the horizontal bottom wall portion 32 of the torque box 30, to the bottom wall 20A of the tunnel RF 20 by the weld nuts WN1, WN2 and bolts B. The horizontal bottom wall portion 64 of the first brace 60 and the horizontal bottom wall portion 32 of the torque box 30 are thereby joined together. Further, the flange 60A that is at the transverse direction other side of the first brace 60 is joined (fastened), together with the horizontal bottom wall portion 32 of the torque box 30, to the bottom wall 20A of the tunnel RF 20 by the weld nut WN3 and the bolt B. Moreover, the joined portion 72 of the first brace 60 is joined (fastened and fixed) to the torque box vertical wall 34 by the weld nut WN4 and the bolt B. The brace vertical wall 66A and the torque box vertical wall 34 are thereby joined together.

Note that a pair of collars C that are cylindrical are provided between the horizontal bottom wall portion 64 and the brace upper panel 68 of the first brace 60, and the collars C are disposed coaxially with the bolts B. Due thereto, there is a structure in which the fastening torque and the like at the time when the first brace 60 is joined (fastened and fixed) to the tunnel RF 20 and the torque box 30 by the bolts B is ensured, and the first brace 60 can be strongly joined (fastened and fixed) to the tunnel RF 20 and the torque box 30.

On the other hand, although not illustrated, the rear end portion of the first brace 60 is joined (fastened and fixed) to the other (the left side) tunnel RF 20 by the weld nuts WN1 through WN4 and the bolts B, in the same way as the front end portion of the first brace 60. Note that, because the joined portion 72 is not formed at the rear end portion of the first brace 60, the one flange 60A is joined (fastened and fixed) to the other tunnel RF 20. Namely, the four weld nuts WN1 through WN4 are provided at the other (the left side) tunnel RF 20 at a region facing the rear end portion of the first brace 60, and these weld nuts WN1 through WN4 are disposed so as to be lined-up in the longitudinal direction. Further, the rear end portion of the first brace 60 is directly joined (fastened and fixed) to the other (the left side) tunnel RF 20 by the weld nuts WN1 through WN4 and the bolts B. Due to the above, the first brace 60 is connected to the side walls 14A (the both vehicle transverse direction side portions) of the tunnel portion 14 via the tunnel RFs 20.

Further, as shown in FIG. 2, the rear end portion of the first brace 60 is disposed at a position that overlaps the vehicle transverse direction inner side end portion of the floor cross member 22 as seen in a bottom view. Namely, there is a structure in which the joined portion of the tunnel RF 20 and the rear end portion of the first brace 60, and the joined portion of the floor cross member 22 and the floor panel 12, overlap as seen in a bottom view. Due thereto, there is a structure in which the rear end portion of the first brace 60 is joined to the portion of the tunnel RF 20 which portion is joined to the floor cross member 22.

(Second Brace 80)

As shown in FIG. 4, the second brace 80 is structured so as to divide the length direction central portion of the first brace 60 at a predetermined range, and so as to be formed by structures that have substantial left-right symmetry with respect to the divided portions of the first brace 60. Namely, the second brace 80 is structured by a second brace front portion 80F that structures the front portion of the second brace 80, and a second brace rear portion 80R that structures the rear portion of the second brace 80. Further, the rear end portion of the second brace front portion 80F and the front end portion of the second brace rear portion 80R are joined to the length direction central portion of the first brace 60, and the brace unit 50 that is formed in an X-shape is formed by the first brace 60 and the second brace 80.

The second brace front portion 80F is structured so as to have substantial left-right symmetry with respect to the front side portion of the first brace 60. Namely, the second brace front portion 80F is structured to include a brace lower panel 82F and a brace upper panel 88F, and is formed substantially in the shape of a hollow rectangular pillar by the brace lower panel 82F and the brace upper panel 88F. Further, the brace lower panel 82F is structured to include a horizontal bottom wall portion 84F that serves as a "second horizontal wall", a brace vertical wall 86F that serves as a "second vertical wall", flanges 80FA and a joined portion 92F. A bent portion 90F (bending ridgeline 90FA) is formed between the horizontal bottom wall portion 84F and the brace vertical wall 86F. Further, as seen in a bottom view, the brace vertical wall 86F and the bent portion 90F (the bending ridgeline 90FA) extend along the direction of inclination of the torque box vertical wall 34 of the other (the left side) torque box 30 (see FIG. 3).

Further, the front end portion of the second brace front portion 80F is joined to the other (the left side) tunnel RF 20 and torque box 30, in the same way as the front end portion of the first brace 60. Moreover, a flange 94F, that is adjacent to the lower side of the horizontal bottom wall portion 64 of the first brace 60, juts-out at the rear end portion of the horizontal bottom wall portion 84F, and the flange 94F is joined by welding or the like to the horizontal bottom wall portion 64 of the first brace 60. Further, at the rear end portion of the second brace front portion 80F, the pair of flanges 80FA are superposed with the one flange 60A of the first brace 60, and the flanges 80FA and this flange 60A are joined together by welding or the like. Due to the above, the rear end portion of the second brace front portion 80F is joined to the length direction central portion of the first brace 60.

On the other hand, the second brace rear portion 80R is structured so as to have substantial left-right symmetry with respect to the rear side portion of the first brace 60. Namely, the second brace rear portion 80R is structured to include a brace lower panel 82R and a brace upper panel 88R, and is formed substantially in the shape of a hollow rectangular pillar by the brace lower panel 82R and the brace upper panel 88R. Further, the brace lower panel 82R is structured to include a horizontal bottom wall portion 84R, a brace vertical wall 86R, and a pair of flanges 80RA. A bent portion 90R (bending ridgeline 90RA) is formed between the horizontal bottom wall portion 84R and the brace vertical wall 86R. Further, as seen in a bottom view, the horizontal bottom wall portion 84R and the bent portion 90R (the bending ridgeline 90RA) extend along the direction of inclination of the torque box vertical wall 34 of the other (the left side) torque box 30.

The rear end portion of the second brace rear portion 80R is joined to the one (the right side) tunnel RF 20, in the same way as the rear end portion of the first brace 60. Moreover, a flange 94R, that is adjacent to the lower side of the horizontal bottom wall portion 64 of the first brace 60, juts-out at the front end portion of the horizontal bottom wall portion 84R, and the flange 94R is joined by welding or the like to the horizontal bottom wall portion 64 of the first brace 60. Further, at the front end portion of the second brace rear portion 80R, the pair of flanges 80RA are superposed with the other flange 60A of the first brace 60, and the flanges 80RA and this flange 60A are joined together by welding or the like. Due to the above, the front end portion of the second brace rear portion 80R is joined to the length direction central portion of the first brace 60.

Operation and effects of the present embodiment are described next while describing the transmission path of the collision load at the time when the vehicle V is involved in an oblique collision. Note that, in the following explanation, description is given of a case in which the vehicle V is involved in oblique collision at the right side of the vehicle V.

As shown in FIG. 2, when the vehicle V is involved in an oblique collision, collision load F1 that is directed obliquely toward the vehicle transverse direction inner side and rear side is inputted to the front end side of the FS member 10, and the collision load F1 is transmitted to the FS member rear portion 10R side of the FS member 10. Further, because the torque box 30 is joined to the FS member rear portion 10R, the collision load F1 that has been inputted to the FS member rear portion 10R is transmitted to the torque box 30.

At the torque box 30, the torque box vertical wall 34 is inclined toward the rear side while heading toward the vehicle transverse direction inner side, as seen in a bottom view. Namely, the torque box vertical wall 34 extends in the load direction of the collision load F1. Therefore, the collision load F1 is mainly transmitted toward the rear side along the bending ridgeline 40A that is between the torque box vertical wall 34 and the horizontal bottom wall portion 32 of the torque box 30.

The front end portion of the right-side tunnel RF 20 and the front end portion of the first brace 60 are joined to the vehicle transverse direction inner side end portion of the torque box 30. Therefore, the collision load F1, that has been transmitted to the torque box 30, is dispersed into collision load F2 that is transmitted to the tunnel RF 20 at the right side, and collision load F3 that is transmitted to the first brace 60. Further, the collision load F2 that has been transmitted to the right-side tunnel RF 20 is transmitted along the tunnel RF 20 toward the rear side. Moreover, the collision load F2 is transmitted from the tunnel RF 20 to the right-side side wall 14A of the tunnel portion 14, and is transmitted along this side wall 14A toward the rear side.

Here, the brace vertical wall 66A of the first brace 60 is disposed parallel to the torque box vertical wall 34 of the torque box 30, and is joined (fastened and fixed) to the torque box vertical wall 34. Further, the horizontal bottom wall portion 64 of the first brace 60 is joined (fastened and fixed) to the horizontal bottom wall portion 32 of the torque box 30 (see FIG. 1 and FIG. 6). Namely, the horizontal bottom wall portion 64 and the brace vertical wall 66A of the first brace 60 are joined respectively to the horizontal bottom wall portion 32 and the torque box vertical wall 34 that extend-out from the bent portion 40 of the torque box 30. Further, the bent portion 70 (the bending ridgeline 70A) is formed at the first brace 60 between the horizontal bottom wall portion 64 and the brace vertical wall 66A, and the bent portion 70 (the bending ridgeline 70A) extends along the direction of inclination of the bent portion 40 of the torque box 30. Therefore, the collision load F3, that is inputted from the torque box 30 to the first brace 60, is effectively transmitted to the bent portion 70 (the bending ridgeline 70A) of the first brace 60, and this collision load F3 can be efficiently transmitted along the bent portion 70 (the bending ridgeline 70A) toward the rear side.

This point is described in detail hereinafter. Namely, if the joining together of the brace vertical wall 66A and the torque box vertical wall 34 were to be omitted, mainly the horizontal bottom wall portion 64 of the first brace 60 would receive the collision load F1 that is transmitted along the bent portion 40 (the bending ridgeline 40A) of the torque box 30 toward the rear side. Further, because the horizontal bottom wall portion 32 of the torque box 30 and the horizontal bottom wall portion 64 of the first brace 60 are disposed with the vertical direction being the plate thickness directions thereof, shearing force would be applied between the horizontal bottom wall portion 64 and the horizontal bottom wall portion 32. Due thereto, there is the possibility that the region between the horizontal bottom wall portion 64 and the horizontal bottom wall portion 32 would break (shear), and, in this case, there would be the concern that the collision load F3, that was transmitted from the torque box 30 to the first brace 60, would not be able to be efficiently transmitted toward the rear side by the first brace 60.

In contrast, in the present embodiment, as described above, the horizontal bottom wall portion 64 of the first brace 60 is joined to the horizontal bottom wall portion 32 of the torque box 30, and in addition, the brace vertical wall 66A of the first brace 60 is joined to the torque box vertical wall 34 of the torque box 30. Therefore, the collision load F1, that is transmitted along the bent portion 40 (the bending ridgeline 40A) of the torque box 30 toward the rear side, can be received also by the brace vertical wall 66A. Further, the brace vertical wall 66A is bent toward the upper side from the horizontal bottom wall portion 64, and, as seen in a bottom view, is inclined toward the rear side while heading toward the vehicle transverse direction inner side. Namely, the plate thickness direction of the brace vertical wall 66A can be set to a direction that is substantially orthogonal to the vertical direction, and the brace vertical wall 66A can be inclined with respect to the vehicle transverse direction as seen in a bottom view. Moreover, because the load direction of the collision load at the time of an oblique collision is obliquely toward the rear side and the vehicle transverse direction inner side, the collision load can be divided into a component of force toward the vehicle transverse direction inner side and a component of force toward the rear side. Thus, when the brace vertical wall 66A receives the collision load F3 that is inputted to the first brace 60, the collision load F3 is applied such that the torque box vertical wall 34 receives, in a plane, the component of force toward the vehicle transverse direction inner side of the collision load F3. As a result, breakage (shearing) between the horizontal bottom wall portion 64 of the first brace 60 and the horizontal bottom wall portion 32 of the torque box 30 is suppressed. Accordingly, the collision load F3, that is transmitted along the bent portion 40 (the bending ridgeline 40A) of the torque box 30 toward the rear side, can be transmitted effectively to the bent portion 70 (the bending ridgeline 70A) of the first brace 60, and can be efficiently transmitted along the bent portion 70 (the bending ridgeline 70A) toward the rear side.

Further, because the rear end portion of the first brace 60 is joined to the left-side tunnel RF 20, the collision load F3 is transmitted from the rear end portion of the first brace 60 to the left-side tunnel RF 20. Moreover, the collision load F3, that has been transmitted to the left-side tunnel RF 20, is transmitted along that tunnel RF 20 toward the rear side. Further, the collision load F3, that has been transmitted to the left-side tunnel RF 20, is transmitted from that tunnel RF 20 to the left-side side wall 14A of the tunnel portion 14, and is transmitted along that side wall 14A toward the rear side. Due to the above, at the time of an oblique collision of the vehicle V, the collision load can be efficiently transmitted to the both vehicle transverse direction side portions of the tunnel portion 14.

Further, at the brace unit 50, the brace unit 50 is formed in an X-shape by the first brace 60 and the second brace 80. Further, the both vehicle transverse direction side portions of the tunnel portion 14 are connected by the brace unit 50 via the tunnel RFs 20. Due thereto, the collision load at the time of an oblique collision can be efficiently transmitted to the tunnel portion 14, while the rigidity of the floor panel 12 is increased by the brace unit 50.

Moreover, the vehicle transverse direction inner side end portions of the torque boxes 30 and the front end portion of the brace unit 50 (the first brace 60 and the second brace 80) are joined (fastened and fixed) to the front end portions of the tunnel RFs 20. Therefore, as described above, the collision load F1 that is inputted to the torque box 30 can be dispersed into the collision load F2 that is transmitted to the tunnel RF 20 and the collision load F3 that is transmitted to the brace unit 50. Further, the collision load F2 that has been inputted to the tunnel RF 20 can be made to flow effectively along the tunnel RF 20 toward the rear side. Further, the collision load F3 that has been inputted to the brace unit 50 is transmitted to the tunnel RF 20, and can be made to flow effectively along the tunnel RF 20 toward the rear side. Accordingly, the collision load can be dispersed effectively by the brace unit 50.

Moreover, the rear end portions of the first brace 60 and the second brace 80 are disposed so as to overlap the tunnel RFs 20 and the vehicle transverse direction inner side end portions of the floor cross members 22 as seen in a bottom view. Due thereto, the collision load F3, that has been transmitted from the rear end portions of the first brace 60 and the second brace 80 to the tunnel RFs 20, is transmitted to the floor cross members 22, and is transmitted via the floor cross members 22 to the rockers 16. Due thereto, the effect of dispersing the collision load at the time of an oblique collision can be improved.

(Modified Example of Brace Unit 50)

Figure 7:
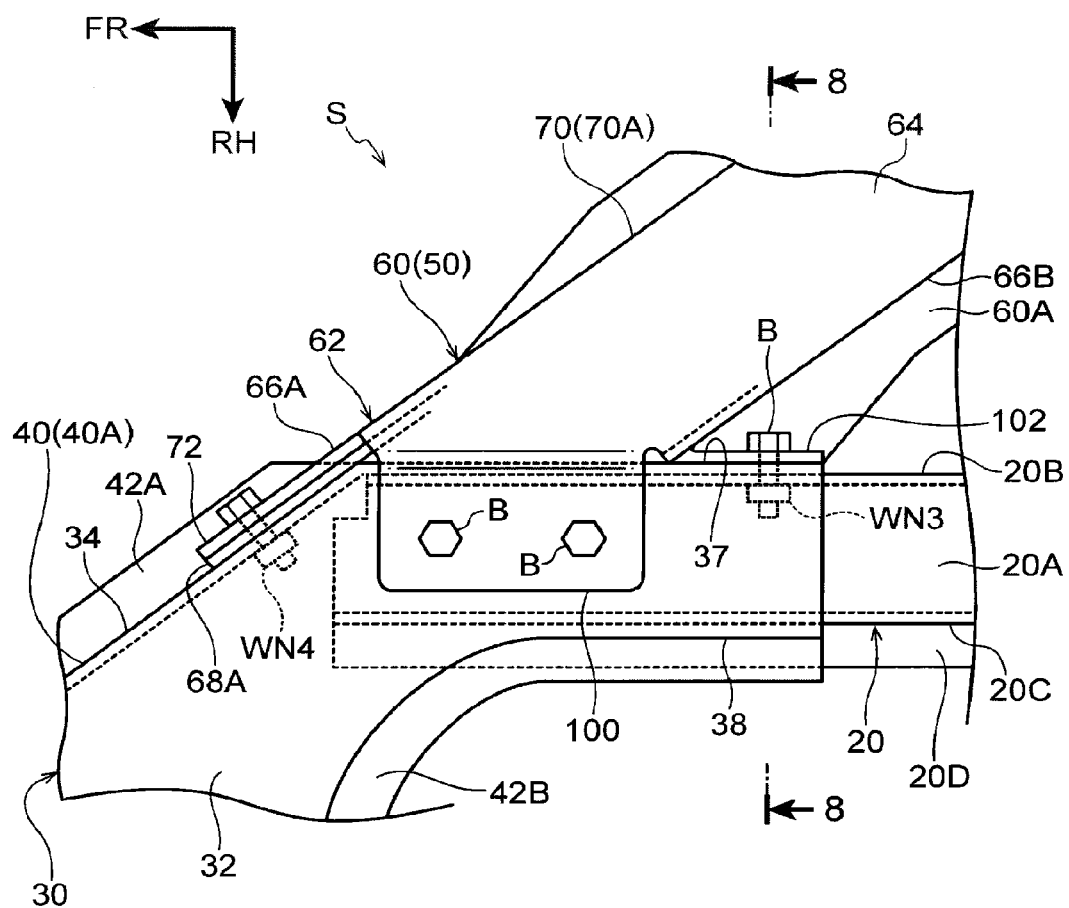
FIG. 7 is a bottom view that is seen from the vehicle lower side and shows the vicinity of the front end portion of the first brace in a modified example of the brace unit shown in FIG. 3.
Figure 8:
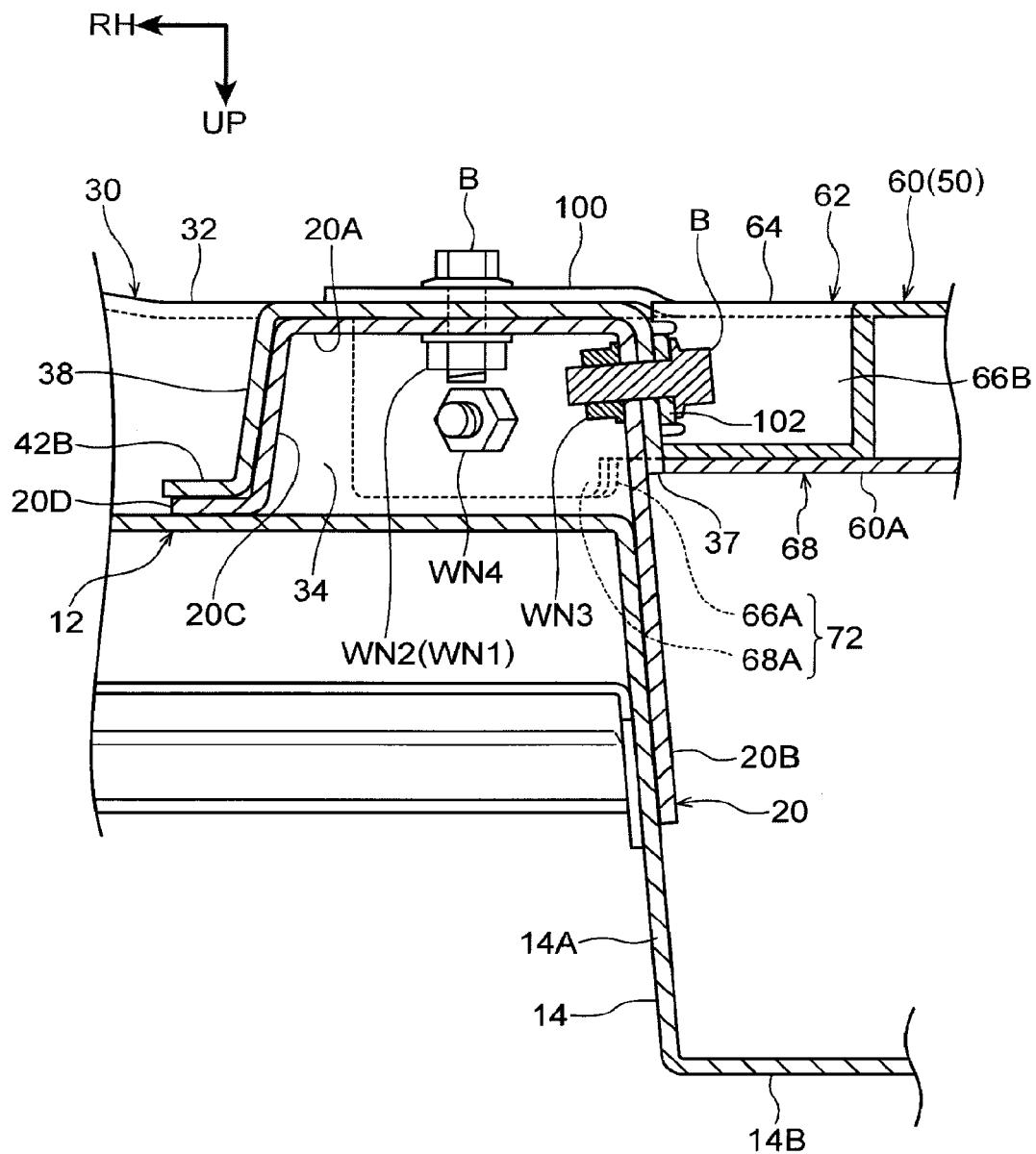
FIG. 8 is a cross-sectional view that is seen from the vehicle rear side and shows the vicinity of the front end portion of the first brace shown in FIG. 7 (a cross-sectional view along line 8-8 of FIG. 7)
Figure 9:
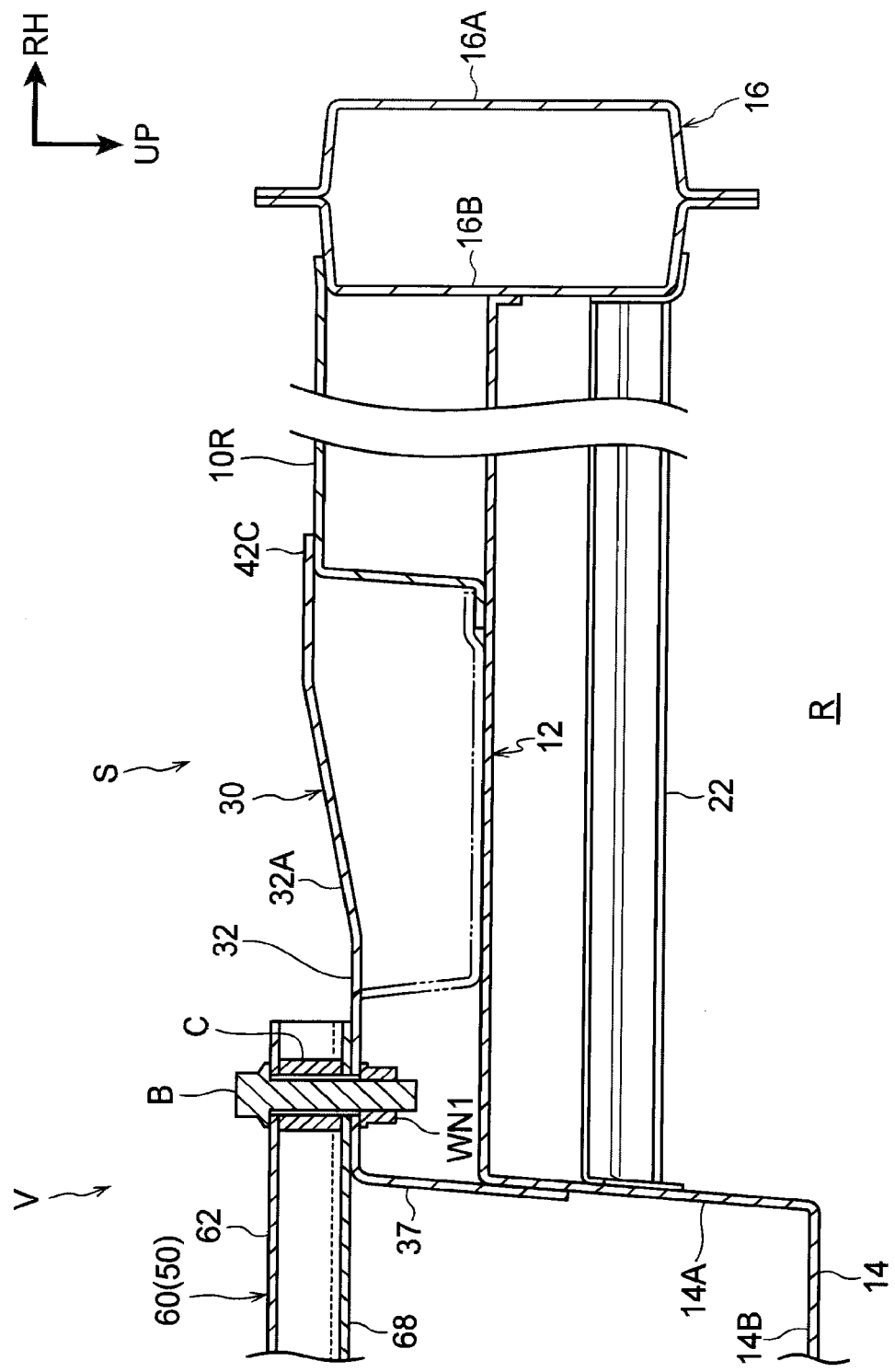
FIG. 9 is a cross-sectional view that corresponds to FIG. 5 and shows a modified example of a method of connecting a floor panel and the torque box shown in FIG. 5.

A modified example of the brace unit 50 is described hereinafter by using FIG. 7 and FIG. 8. The modified example is structured similarly to the present embodiment, except for the following points. Namely, in the modified example, the brace unit 50 is disposed at the vehicle transverse direction inner sides of the pair of left and right tunnel RFs 20, so as to span the opening portion of the tunnel portion 14. Concrete description is given hereinafter.

At the brace unit 50, the vertical position of the first brace 60 is set such that the bottom surface of the horizontal bottom wall portion 64 of the first brace 60 is flush with the bottom surface of the horizontal bottom wall portion 32 at the torque box 30. Further, a first fixing flange portion 100 is formed integrally with the front end portion of the horizontal bottom wall portion 64. The first fixing flange portion 100 extends-out toward the vehicle transverse direction outer side from the horizontal bottom wall portion 64. Moreover, the proximal end portion of the first fixing flange portion 100 is bent toward the lower side in the shape of a step, and the first fixing flange portion 100 is disposed one step lower than the horizontal bottom wall portion 64, and is disposed so as to be parallel to the horizontal bottom wall portion 64. Further, the first fixing flange portion 100 is superposed with the lower side of the horizontal bottom wall portion 32 of the torque box 30, and is joined (fastened and fixed), together with the horizontal bottom wall portion 32, to the bottom wall 20A of the tunnel RF 20 by the bolts B and the weld nuts WN1, WN2. The horizontal bottom wall portion 64 of the first brace 60 and the horizontal bottom wall portion 32 of the torque box 30 are thereby joined (fastened and fixed) together.

Further, the joined portion 72 (the brace vertical wall portion 66A and the folded portion 68A) of the first brace 60 extends-out further toward the vehicle transverse direction outer side than in the present embodiment, and the joined portion 72 is superposed with the front side of the torque box vertical wall 34 of the torque box 30. Further, the joined portion 72 is joined (fastened and fixed) to the torque box vertical wall 34 by the bolt B and the weld nut WN4.

Moreover, a second fixing flange portion 102 that juts-out toward the rear side is formed integrally with the front end portion of the brace vertical wall 66B of the first brace 60. This second fixing flange portion 102 is superposed with the vehicle transverse direction inner side of the inner side wall 37 of the torque box 30. Further, in the present modified example, the weld nut WN3 is fixed to the vehicle transverse direction outer side surface of the inner side wall 20B of the tunnel RF 20, and the weld nut WN3 and the second fixing flange portion 102 are disposed so as to face one another across the inner side wall 20B of the tunnel RF 20 and the inner side wall 37 of the torque box 30. Further, the second fixing flange portion 102 is joined (fastened and fixed) to the inner side wall 20B of the tunnel RF 20 via the inner side wall 37 of the torque box 30, by the weld nut WN3 and the bolt B. The front end portion of the first brace 60 is thereby joined (fastened and fixed) to the inner side wall 20B of the tunnel RF 20.

Note that, although not illustrated, flange portions that correspond to the first fixing flange portion 100 and the second fixing flange portion 102 are formed also at the rear end portion of the first brace 60, and the rear end portion of the first brace 60 is joined (fastened and fixed) to the tunnel RF 20 at the left side. Moreover, in the same way as in the present embodiment, the second brace 80 is structured so as to divide the length direction central portion of the first brace 60 at a predetermined range, and so as be formed by structures that have substantial left-right symmetry with respect to the divided portions of the first brace 60. Therefore, the front end portion of the second brace front portion 80F and the rear end portion of the second brace rear portion 80R also are structured similarly to the front end portion and the rear end portion of the first brace 60.

Due to the above, in the present modified example as well, the brace vertical wall 66A of the first brace 60 is disposed parallel to the torque box vertical wall 34 of the torque box 30, and is joined (fastened and fixed) to the torque box vertical wall 34. Further, the horizontal bottom wall portion 64 of the first brace 60 is joined (fastened and fixed) to the horizontal bottom wall portion 32 of the torque box 30. Therefore, in the same way as in the present embodiment, at the time of an oblique collision, the collision load F3, that is inputted from the torque box 30 to the first brace 60, is transmitted effectively to the bent portion 70 (the bending ridgeline 70A) of the first brace 60, and this collision load F3 can be efficiently transmitted along the bent portion 70 (the bending ridgeline 70A) toward the rear side.

Further, in the present modified example, the second fixing flange portion 102 is formed integrally with the front end portion of the brace vertical wall 66B at the first brace 60, and the second fixing flange portion 102 is joined (fastened and fixed) to the inner side wall 20B of the tunnel RF 20. Namely, there is a structure in which the tunnel RF 20 is supported from the vehicle transverse direction inner side by the second fixing flange portion 102 of the first brace 60. Therefore, when, at the time of an oblique collision, the collision load F1 that is directed obliquely toward the rear side and the vehicle transverse direction inner side is transmitted from the torque box 30 to the tunnel RF 20, this collision load F1 can be transmitted to the first brace 60 while this collision load F1 is received by the second fixing flange portion 102 and the brace vertical wall 66A of the first brace 60. Due thereto, the collision load F1 can be transmitted even more efficiently to the first brace 60 while breakage (shearing) at the joined portion of the first brace 60 and the tunnel RF 20 (in detail, the joined portion of the horizontal bottom wall portion 64 of the first brace 60 and the horizontal bottom wall portion 32 of the torque box 30) is suppressed more.

Note that, in the present modified example, the second fixing flange portion 102 is formed at the brace vertical wall 66B, but the region where the second fixing flange portion 102 is formed at the first brace 60 is not limited to this. For example, the second fixing flange portion 102 may be formed at the flange 60A of the first brace 60, or may be formed at the brace upper panel 68. Further, the second fixing flange portion 102 may be structured so as to be joined directly to the inner side wall 20B of the tunnel RF 20.

Further, in the present modified example, the first fixing flange portion 100 and the second fixing flange portion 102 are formed integrally with the brace lower panel 62 of the first brace 60, but the first fixing flange portion 100 and the second fixing flange portion 102 may be structured as bodies that are separate from the brace lower panel 62. Then, the first fixing flange portion 100 and the second fixing flange portion 102 that are structured as separate bodies may be made integral with the brace lower panel 62.

Further, in the present embodiment and the modified example, the tunnel RFs 20 are provided at the floor panel 12, but the tunnel RFs 20 may be omitted from the floor panel 12. Concretely, as shown in FIG. 8, the inner side wall 37 of the torque box 30 is disposed so as to be adjacent to the vehicle transverse direction inner side of the side wall 14A of the tunnel portion 14, and the inner side wall 37 and the side wall 14A are fixed by welding or the like. Further, the weld nuts WN1 through WN4 are fixed to the top surface of the horizontal bottom wall portion 32 of the torque box 30. Further, the front end portions of the first brace 60 and the second brace 80 are joined (fastened and fixed) directly to the vehicle transverse direction inner side end portions of the torque boxes 30. On the other hand, although not illustrated, at the rear end portions of the first brace 60 and the second brace 80, the vertical dimensions of the first brace 60 and the second brace 80 may be made to be large, and the first brace 60 and the second brace 80 may be joined (fastened and fixed) directly to the floor panel 12, or may be joined (fastened and fixed) to the floor panel 12 via brackets or the like.

Further, in the present embodiment and the modified example, at the brace unit 50, the first brace 60 and the second brace 80 are made integral by welding, but the method of forming the brace unit 50 is not limited to this. For example, the brace unit 50 may be structured by dividing the first brace 60 into two members in the longitudinal direction in the same way as the second brace 80, and joining the first brace 60 and the second brace 80 that are each structured by two members. Further, for example, the brace lower panel 62, the brace lower panel 82F and the brace lower panel 82R may be made to be a lower panel that is formed integrally by press molding or the like, and the brace upper panel 68, the brace upper panel 88F and the brace upper panel 88R may be made to be an upper panel that is formed integrally by press molding or the like, and the brace unit 50 may be formed by joining this lower panel and this upper panel.

Further, although the tunnel portion 14 of the floor panel 12 and the tunnel RFs 20 are formed as separate bodies in the present embodiment and the modified example, the tunnel portion 14 and the tunnel RFs 20 may be structured integrally.

Further, in the present embodiment and the modified example, the main body portion 32A of the torque box 30 is formed in a substantially triangular shape as seen in a bottom view, and the torque box 30 overall is formed in a substantially triangular shape as seen in a bottom view. However, the shape of the torque box 30 be changed appropriately. For example, the torque box 30 may be made to be a shape that extends substantially rectilinearly in the vehicle transverse direction.

Moreover, the torque box 30 is structured so as to extend from the front side member 10 toward the vehicle transverse direction inner side in the present embodiment and the modified example. However, the forms of the torque box 30 and the front side member 10 are not limited to this. For example, there may be a structure in which the rear portion of the front side member 10 is curved toward the tunnel portion 14 side, and the front side member 10 and the torque box 30 are made integral.

Further, the present embodiment and the modified example describe examples in which the vehicle lower portion structure S is applied to the vehicle transverse direction both sides with respect to the tunnel portion 14 of the floor panel 12. However, the vehicle lower portion structure S may be applied only to one of the vehicle transverse direction outer sides with respect to the tunnel portion 14.

What is claimed is:

1. A vehicle lower portion structure comprising:
   a tunnel portion that extends in a vehicle longitudinal direction at a vehicle transverse direction central portion of a floor portion of a vehicle cabin, and opens toward a vehicle lower side as seen from the vehicle longitudinal direction;
   a front side member that is disposed such that a length direction thereof extending in the vehicle longitudinal direction, and whose rear portion is disposed at a vehicle lower side of the floor portion and a vehicle transverse direction outer side of the tunnel portion;
   a first member that is structured to include a first horizontal wall that extends from the rear portion of the front side member toward a vehicle transverse direction inner side and whose plate thickness direction is a vehicle vertical direction, and a first vertical wall that is bent toward a vehicle upper side from the first horizontal wall and that, as seen in a bottom view, is inclined toward a vehicle rear side while heading toward the vehicle transverse direction inner side; and
   a second member that is disposed so as to span an opening portion of the tunnel portion, extends along a direction of inclination of the first vertical wall, and connects both vehicle transverse direction side portions of the tunnel portion, the second member being structured to include a second horizontal wall that is disposed such that a plate thickness direction thereof extends in the vehicle vertical direction, and that is joined to the first horizontal wall, and a second vertical wall that is bent toward the vehicle upper side from the second horizontal wall, is disposed parallel to the first vertical wall, and is joined to the first vertical wall.

2. The vehicle lower portion structure of claim 1, wherein a pair of first members are provided at vehicle transverse direction outer sides of the tunnel portion, and a pair of second members are provided at the opening portion of the tunnel portion, and the pair of second members intersect each other in an X-shape as seen in a bottom view, and one of the second members is joined to a length direction central portion of the other of the second members.

3. The vehicle lower portion structure of claim 2, wherein a pair of tunnel reinforcements, that extend in the vehicle longitudinal direction, are joined to portions of the floor portion which portions are adjacent to the tunnel portion, and
   vehicle transverse direction inner side end portions of the first members and front end portions of the second members are joined to the tunnel reinforcements.

4. The vehicle lower portion structure of claim 3, wherein rockers that extend in the vehicle longitudinal direction are provided at vehicle transverse direction both sides of the floor portion, and the rockers are connected to the tunnel reinforcements by cross members that extend in a vehicle transverse direction, and
   as seen in a bottom view, rear end portions of the second members are joined to joined portions, that are joined to the cross members, at the tunnel reinforcements.

5. The vehicle lower portion structure of claim 3, wherein each of the tunnel reinforcements is structured to include, as seen in a cross-sectional view seen from the vehicle longitudinal direction, a bottom wall that is disposed such that a plate thickness direction thereof extends in the vehicle vertical direction, an inner side wall that extends toward the vehicle upper side from a vehicle transverse direction inner side end of the bottom wall, and an outer side wall that extends toward the vehicle upper side from a vehicle transverse direction outer side end of the bottom wall, and
   the front end portions of the second members are joined to the inner side walls.

* * * * *